F. E. SPENCER.
SPRING NUT LOCK.
APPLICATION FILED MAR. 28, 1914.

1,251,832.

Patented Jan. 1, 1918.

WITNESSES.
J. R. Keller
John F. Will

INVENTOR.
Frank E. Spencer
By Kay Totten & Powell
attys

UNITED STATES PATENT OFFICE.

FRANK E. SPENCER, OF THORNBURG, PENNSYLVANIA.

SPRING NUT-LOCK.

1,251,832.  Specification of Letters Patent.  Patented Jan. 1, 1918.

Application filed March 28, 1914. Serial No. 827,837.

*To all whom it may concern:*

Be it known that I, FRANK E. SPENCER, a citizen of the United States, and resident of Thornburg, in the county of Allegheny and State of Pennsylvania, have invented a new and useful Improvement in Spring Nut-Locks; and I do hereby declare the following to be a full, clear, and exact description thereof.

My invention relates to nut locks and is particularly concerned with improvements in the form of nut locks set forth in my copending application, Serial No. 725,600, filed October 14, 1912.

While the locking ribs or shoulders extending along opposite sides of that nut receiving washer have proved most effective in holding the nut tight, it is also found that in some instances the lower edges of the nut at the corners are unduly worn away in riding over these ribs. I have found in practice that it is possible to dispense with certain portions of these ribs or shoulders, thereby facilitating the turning of the nut into locking position, without detriment to the locking action, while at the same time the wear on the corners of the nut is greatly reduced and practically eliminated.

A further object of the invention is to so shape the body portion of the washer as to facilitate the passage of the nut over the locking ribs, and to provide a washer of a shape which may be cut from a strip of rolled material which may be economically and easily produced. Furthermore, the shape of the washer, as hereinafter described, has the advantage that when the nut is screwed home, the under face of the washer will lie flat against the part to be secured, and at the same time the washer will not readily break when the nut is tightened.

Figure 1:
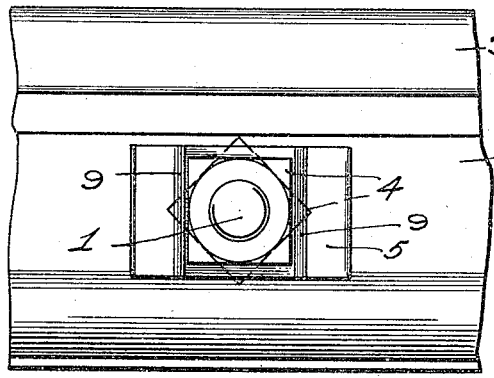
Figure 2:
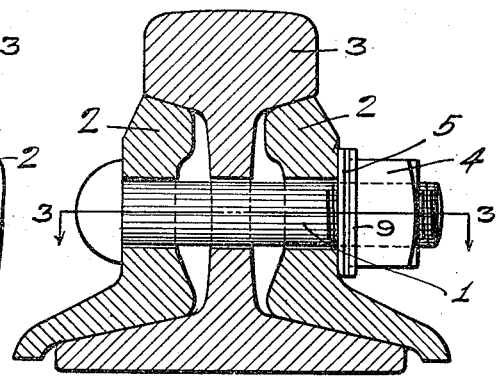
Figure 5:
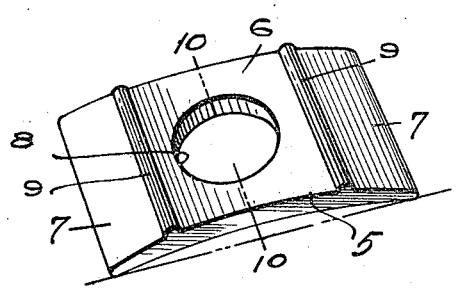
Figure 3:
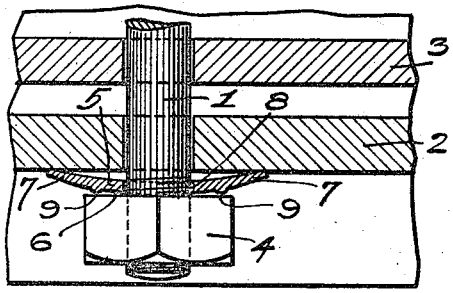
Figure 6:
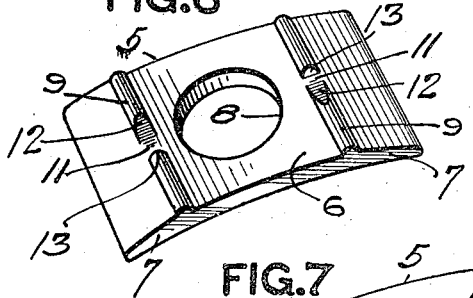
Figure 4:
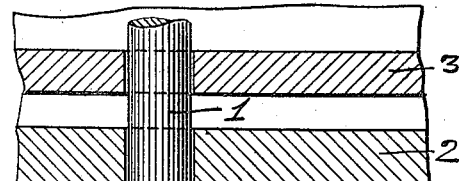

In the drawings which illustrate preferred embodiments of the invention, Figure 1 is a fragmentary side view of a rail joint showing the invention applied thereto. Fig. 2 is a transverse section on Fig. 1. Fig. 3 is a horizontal sectional view on the line 3—3, Fig. 2, showing the position of the parts before the nut is screwed home. Fig. 4 is a view similar to Fig. 3, showing the nut screwed home. Fig. 5 is a perspective view of one form of the washer. Fig. 6 is a view of a modification, and Fig. 7 is a view of a second modification.

Referring to the embodiment of the invention illustrated in Figs. 1 to 5 inclusive, a bolt 1 is shown in position for securing the fish plates 2—2 to the joint of the rails 3. The bolt carries the nut 4 and between the nut and the fish plate is interposed my improved washer 5. This washer comprises a curved body member 6, the outer surface of which is convex, and the inner surface concave, as shown. The central portion of the body member is of uniform thickness throughout, but is reduced in thickness at the opposite sides 7—7, to increase the resiliency of the washer as a whole. Extending parallel with the sides 7—7, and between the same and the bolt aperture 8, are the locking shoulders 9—9 which may be of any desired shape, but are preferably half round as here shown. The height of these shoulders and the curvature of the body portion is such that as the nut is being screwed down, the central portion thereof will contact first with the washer body along the line 10—10. As the nut is screwed farther home, the bottom thereof will come in contact with, and ride over the locking ribs 9—9, until finally when the nut is screwed home, the washer will be flattened out as indicated in Fig. 4, and the nut will lie between the locking shoulders 9—9, which holds it securely against accidental loosening. Moreover, since side edges 7—7 are tapered or reduced in thickness, there will be little tendency of these side portions to crack off, as is frequently found to be the case with resilient washers at present in use.

It is found in practice that when the locking shoulders extend continuously across the breadth of the washer as shown in Fig. 5, the lower edges of the nut that first come into contact with the shoulders when the nut is being screwed home, become worn or abraded and also those lower edges of the nut which are last to leave the shoulders when the nut is being screwed home, also become worn, by reason of the fact that these edges snap down off the locking ribs as the side faces of the nut are turned into alinement with the locking ribs. To prevent such wear of the nut, I cut away portions of the locking shoulders 9. In Fig. 6, these shoulders are cut away at the central portions 11 only, to afford clearance for the corners of the nut for the greater part of their travel over these shoulders. It is obvious, however, that when the nut is finally turned into alinement with the shoulders, the portions of the ribs 9 on either side of the recesses 11 will securely hold the nut in locked position. In order to facilitate the turning of the nut to locked position, one end of each of the notches 11 is beveled as at 12, while the opposite ends 13 may be more or less abrupt. Furthermore, in order to reduce the wear on what for convenience I term the rear edges of the nut when unscrewed, the abrupt ends 13 of the notches 11 are cut back some distance from the longitudinal center of the ribs 9, so that the corners of the nut shall have ridden approximately free of the ribs before they encounter the abrupt shoulder 13.

Figure 7:
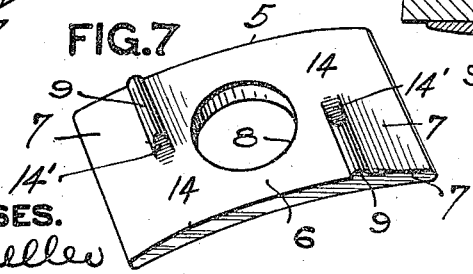

In the modified form of the locking washer shown in Fig. 7, diagonally opposite extremities of each of the ribs 9 are shown as cut away entirely, leaving the face of the washer substantially clear at the points 14—14. The portions of the ribs 9 remaining however, are sufficient to lock the nut in secured position for most practical purposes. The inner ends of these ribs are beveled as at 14'—14' in the manner heretofore described and for the same purpose.

While I have herein described particular embodiments of the invention, it is to be understood that the same may be altered in details of construction and arrangements of parts within the scope of the appended claims.

What I claim is:

1. A combined nut lock and washer having a curved body portion, the central part of which is of uniform thickness throughout, having opposite side edges reduced in thickness to form resilient wings, locking ribs extending along opposite sides of the bolt receiving aperture, the curvature of the outer face of the washer being such that the said ribs normally lie below the plane of the highest part thereof so that the under side of the nut will contact first with the transverse central line of the washer before engaging the locking shoulders, the curvature of the washer being such that the inner side thereof will lie flat against the part to be clamped when the nut is screwed home.

2. A combined nut lock and washer comprising a plate having its central portion forming a nut seat of uniform thickness, and having opposite side edges reduced in thickness said washer having locking shoulders upon either side of the bolt receiving aperture, parallel with the reduced edges of the washer, the curvature of the nut seat being such that the said ribs normally lie below the plane of the highest part thereof so that the bottom of the nut will first contact therewith along a transverse line parallel with the locking shoulders, as the nut is being screwed home, and the curvature of the under side of the washer being such that said side will lie flat against the part to be secured when the nut is screwed home.

In testimony whereof I, the said FRANK E. SPENCER, have hereunto set my hand.

FRANK E. SPENCER.

Witnesses:
JOHN F. WILL,
JOHN R. KELLER.

Copies of this patent may be obtained for five cents each, by addressing the "Commissioner of Patents, Washington, D. C."